United States Patent [19]
McArthur et al.

[11] Patent Number: 5,143,804
[45] Date of Patent: Sep. 1, 1992

[54] BATTERY ASSEMBLY

[75] Inventors: William J. McArthur; Donald A. Thompson, both of Clemmons, N.C.

[73] Assignee: Duracell Inc., Bethel, Conn.

[21] Appl. No.: 697,358

[22] Filed: May 8, 1991

[51] Int. Cl.[5] .............................................. H01M 2/22
[52] U.S. Cl. .................... 429/148; 429/157; 429/159; 29/623.4
[58] Field of Search ............... 429/148, 157, 159, 99, 429/178; 29/623.4

[56] References Cited

U.S. PATENT DOCUMENTS

| | | | |
|---|---|---|---|
| 3,655,456 | 4/1972 | Hamel | 429/178 X |
| 4,547,438 | 10/1985 | McArthur et al. | 429/157 X |
| 4,640,874 | 2/1987 | Kelm | 429/157 X |
| 4,959,280 | 9/1990 | Amthor | 429/99 X |

FOREIGN PATENT DOCUMENTS

| | | | |
|---|---|---|---|
| 235232 | 9/1959 | Australia | 429/159 |
| 495851 | 9/1953 | Canada | 429/159 |

Primary Examiner—Stephen Kalafut
Attorney, Agent, or Firm—Ronald S. Cornell; James B. McVeigh, Jr.

[57] ABSTRACT

A battery structure using cylindrically shaped zinc/air cells electrically connected in series, the cells being assembled so that a first number thereof are stacked in a first orientation in an in-line stack and a second number thereof are positioned adjacent the in-line stack in a second orientation perpendicular to the first orientation. The cells at the end of its series are connected to the anode and cathode terminals of a terminal board. The cell-terminal board assembly is inserted in a housing having nesting cavities into which portions of the cells are securely nested and a cover, affixed to the housing to form a battery container, has corresponding nesting cavities into which oppositely disposed portions of the cells are securely nested. Openings having blocking means associated therewith are provided at each end of the container to permit air to enter for interaction with the zinc in the cells but to prevent other objects from entering and making contact with the cells.

16 Claims, 6 Drawing Sheets

BATTERY ASSEMBLY

INTRODUCTION

This invention relates generally to batteries and, more particularly, to batteries comprising an assembly of electrochemical cells.

BACKGROUND OF THE INVENTION

Assemblies of electrochemical cells interconnected in series and positioned in suitable containers for providing batteries are well known to the art. Such assemblies, for example, utilize electrochemical cells having chemically active substances which react with each other to generate an electrical potential between positive and negative terminals thereof. One such exemplary cell structure is of the metal/air type which, in a particular embodiment, uses zinc and air as the reacting substances.

A particular example of an effectively operating battery using an assembly of zinc/air cells is described in U.S. Pat. No. 4,547,438, issued on Oct. 5, 1985 to W. J. McArthur et al. The structure therein uses a stack of aligned, series connected cells extending in-line along the long dimension of a rectangular parallelopiped housing structure or container. The housing includes a plurality of apertures along each of the side walls thereof for ventilating the interior of the housing, such apertures preferably being covered by a porous, polymeric material for permitting the passage of air into the housing, but preventing the entry of water or other objects. The overall structure uses a relatively limited number of components as compared with structures used prior thereto, which components are securely and efficiently assembled into a standard sized housing which utilizes conventional, externally available positive and negative snap terminals for providing the desired overall electrical potential, e.g. 9.0 volts, for use in a variety of battery operated devices, such as transistor radios, and the like.

Although such battery structures have proved useful when using the type of zinc/air cells that were available at the time of the design thereof, the particular housing and cell assembly thereof is incapable of use with larger size, higher capacity cells without increasing the size of the housing. However, such housings must be of a standard size since they must be able to fit into the standard size spaces which are already provided for them in the conventional battery operated devices in which they are to be used. Accordingly, it is desirable, to provide a battery structure in which such larger, higher capacity cells can be accommodated in such a standard size housing so as to provide a battery which is readily usable in battery operated devices and has a longer operating life, without increasing the manufacturing costs and, hence, the cost to purchasers and users thereof. Thus, such batteries should be designed to provide a more effective milliamp-hour/dollar ratio than previously available zinc/air cell batteries. Such higher capacity cells are larger than those previously available in that, for cylindrical button cell configurations, the heights of the cells are greater than those in the cells depicted in the aforesaid McArthur et al. patent.

It is further desirable that a battery using the higher capacity, series-connected zinc/air cells be fabricated using even fewer components and easier-to-use and less costly assembly techniques than those used with respect to the structures of the aforesaid McArthur et al. patent so as to further reduce the overall component costs, as well as the costs and time for manufacture thereof. Such an improved structure should still retain all the advantages of zinc/air cell structures without introducing any operational, structural or manufacturing disadvantages.

BRIEF SUMMARY OF THE INVENTION

In accordance with the invention, a battery uses a first plurality of cells which are positioned within a plastic housing in an in-line stack configuration, each cell having a first orientation thereof, and a second plurality of cells each of which is positioned adjacent the first plurality of cells within the housing and has a second orientation which is substantially perpendicular to the first orientation. The first and second pluralities of cells are tab-welded so as to be electrically connected in series. The tab-welding operation takes place so that all cells are formed in an in-line configuration. The second plurality of cells in the tab-welded configuration are then folded over to their desired perpendicular orientations. A standard terminal board configuration having well-known snap terminals for connections external to the battery is tab welded to the folded stack assembly of cells.

The folded configuration is readily inserted into the housing so that the cells are securely nested in nesting cavities formed at the interior surface of the base of the housing and at the interior surface of the cover affixed to the housing. When using zinc-air cells, the housing has openings preferably formed at each end thereof for permitting air to enter and make contact with the cells for interaction with the cells to establish an electrical potential at each cell. Tabs formed at each end of the cover effectively block the openings so as to permit air entry but to prevent the entry of foreign objects into the interior of the housing.

Accordingly, such a cell arrangement permits a standard size housing to accommodate larger size, higher capacity cells in a manner such that the overall structure utilizes fewer components than used in prior battery structures. The structure is readily assembled, the manufacturing costs of the finished battery thereby being reduced so that the increased cost of the higher capacity cells does not require any greater overall production costs than those needed for previously available batteries using less expensive, lower capacity cells.

DESCRIPTION OF THE INVENTION

The invention can be described in more detail with the help of the accompanying drawings wherein FIG. 1 shows an exploded perspective view of an embodiment of a battery of the invention;

Figure 1:
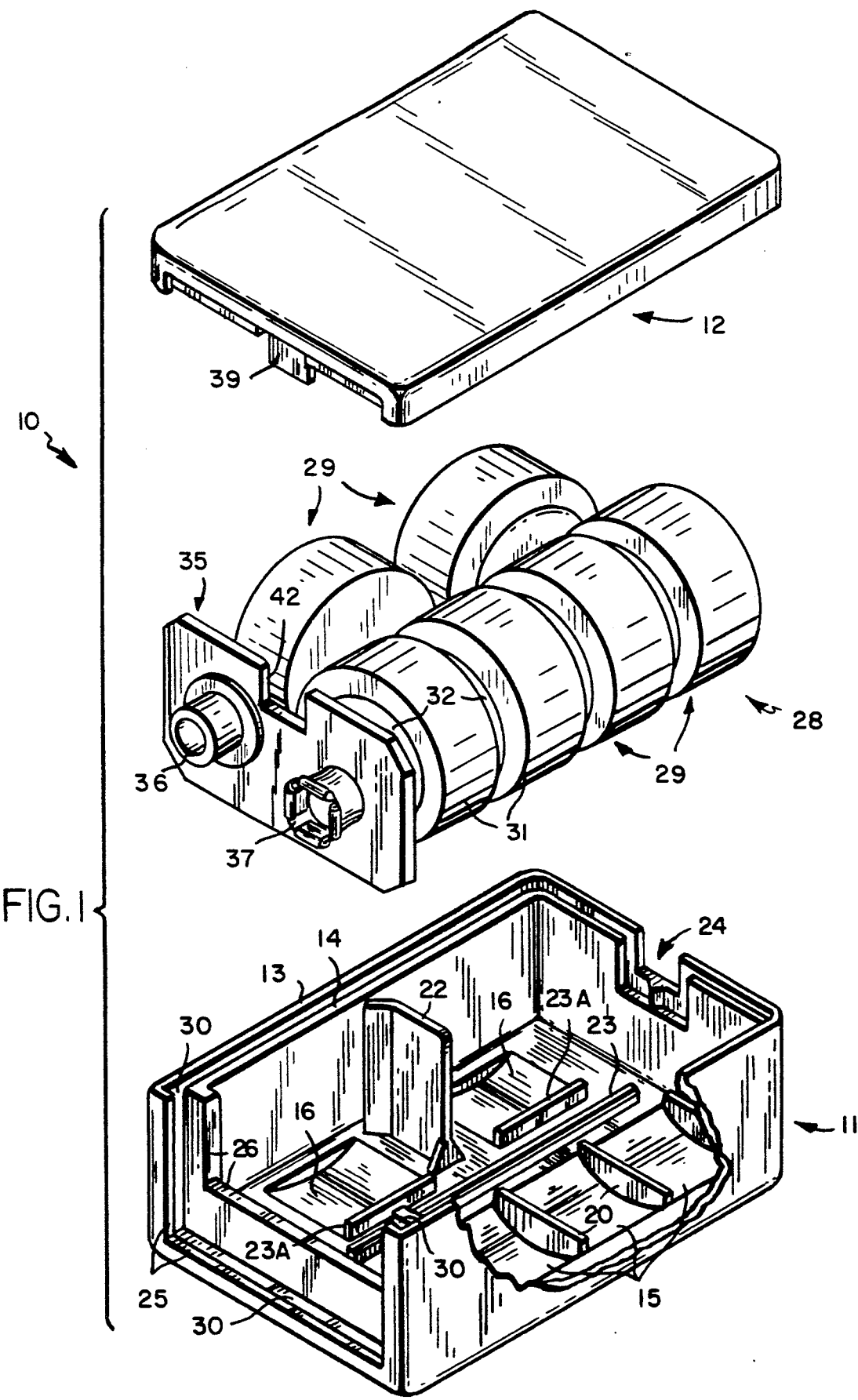

As can be seen in FIGS. 1-4, a particular preferred embodiment of a battery structure 10 in accordance with the invention comprises a housing component 11 and a cover component 12. The housing is molded of a suitable plastic material and has an outer wall portion 13 and a recessed inner wall portion 14. The interior base of housing 11 has a plurality of arcuate indentations formed therein which provide separate concave nesting cavities into which an assembly of a plurality of electrochemical cells can be nested, as discussed below. In the particular embodiment being described, for example, four nesting cavities 15, the arcuate surfaces of which have a first orientation, are formed adjacent one inner side wall portion along the long dimension of the housing and two cavities 16, the arcuate surfaces of which have a second orientation, perpendicular to that of cavities 15 are formed adjacent the opposite inner side wall portion as shown. Portions of the cylindrical surfaces of each of the cells 2 in cell assembly 28 are nested in such nesting cavities, when the cell assembly 28 is positioned within housing 11, as further discussed below. For reasons which will become evident hereafter, tab elements 39 (FIGS. 1 and 2), and 39A (FIG. 2) are formed at each end of cover 12.

Figure 2:
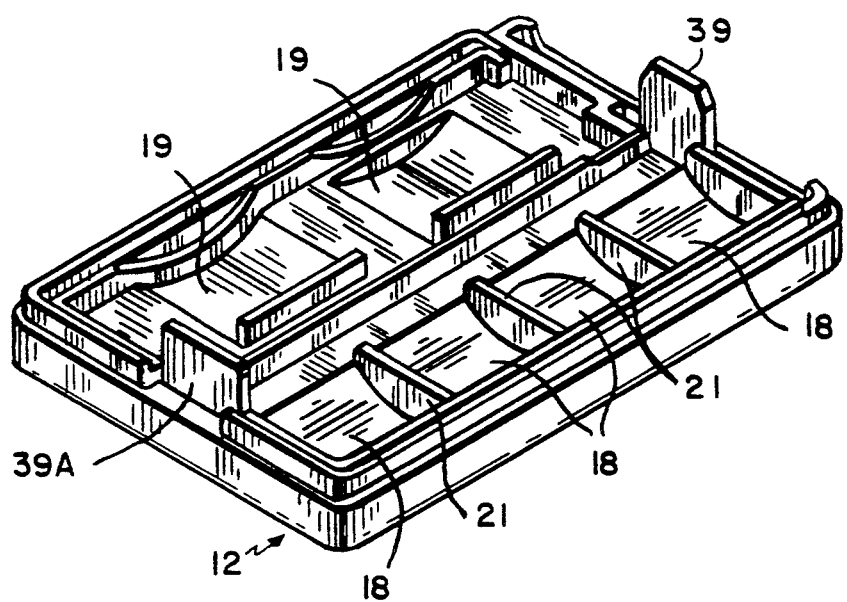
FIG. 2 shows a perspective view of the interior of the cover of the battery of FIG. 1.

As shown in FIG. 2, the interior surface of cover 12 has corresponding arcuate cavities 18 and 19 formed therein into each of which oppositely disposed portions of the cylindrical surfaces of the cells are also nested when the cover is affixed to the housing after the cell assembly has been positioned therein. When the cells are assembled in their positions within housing 11 and cover 12, they are held securely between nesting cavities 15 and 16 of the housing 11 and nesting cavities 18 and 19 of the cover 12.

As shown in FIGS. 1 and 2, barrier elements 20 and 21 are formed between cavities 15 and 18, respectively, to separate the cells nested in adjacent cavities thereof. A barrier element 22 is formed so as to project inwardly from the inner side wall position of housing 11 between cavities 16 so as to separate from each other the cells which are nested therein on either side of barrier 22. A further barrier element 23 and barrier elements 23A parallel thereto are formed in the bottom surface of housing 11 at the central region thereof along the center length thereof to maintain a separation between the cells nested in cavities 15 and the cells nested in cavities 16. One end of housing 11 has a rectangular opening 24 formed at the center region of the top thereof, as shown. The other end of housing 11 has a large rectangular opening formed in the outer wall portion 13 and a corresponding smaller rectangular opening formed in the inner wall portion as shown in FIG. 1. A slot (FIG. 1) is formed between the edges 25 of the outer wall portion and the edges 26 of the inner wall portion.

Figure 3:
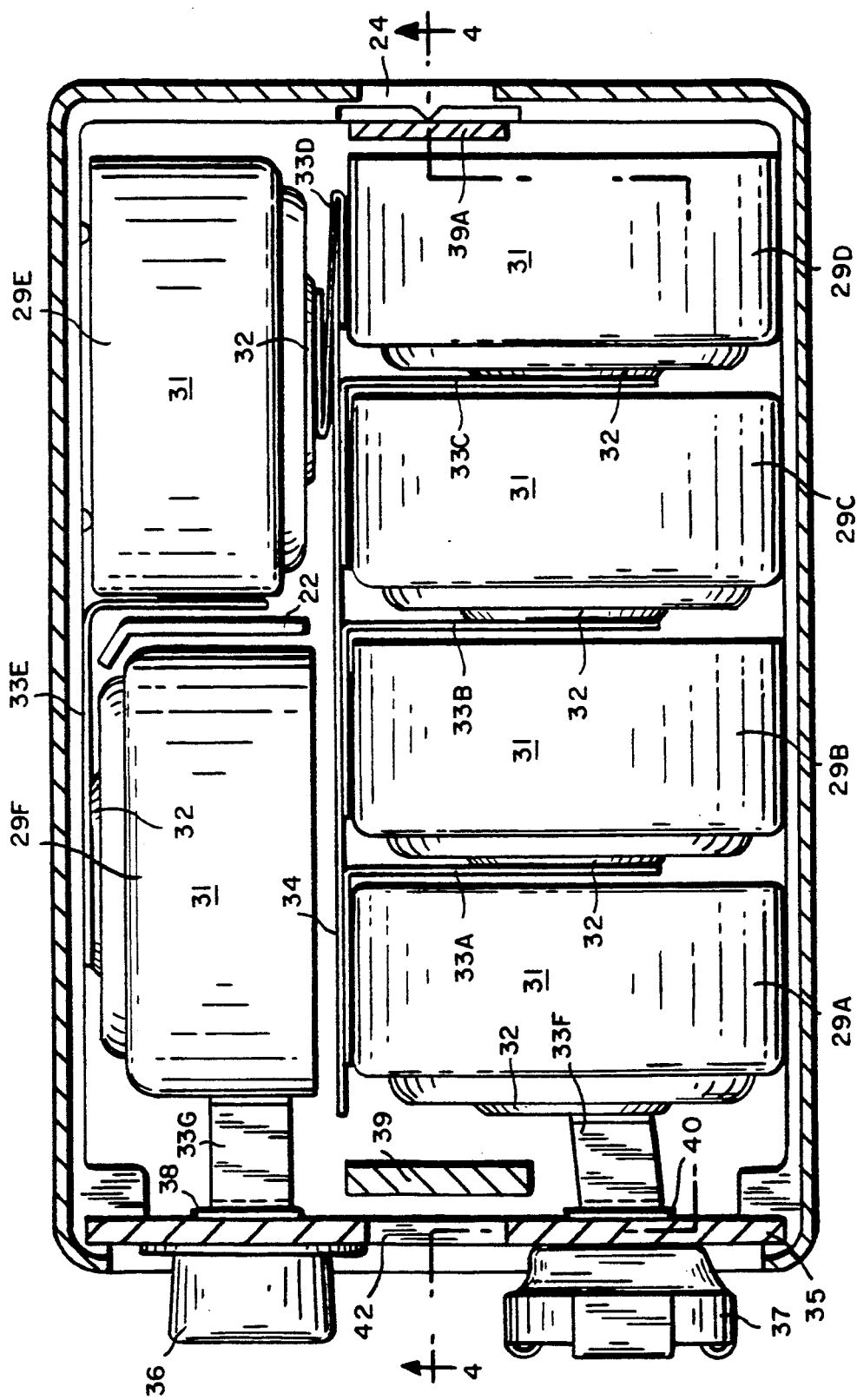
FIG. 3 shows a view in section of the battery of FIG. 1, taken along the line 3—3 of FIG. 4, with the cells and terminal board of the cell assembly positioned in the housing thereof.

As shown in FIGS. 1 and 3, each of the electrochemical cells 29 which are used in the particular exemplary embodiment of the invention being depicted herein, has a substantially cylindrical shape and includes an electrically conductive cup-shaped structure 31 which serves as a cathode, or negative, terminal and an electrically conductive cap 32 which serves as an anode, or positive terminal. In the particular embodiment depicted, four cells 29A, 29B, 29C and 29D, are stacked in an in-line arrangement thereof with the flat surfaces thereof adjacent each other. The cup-shaped cathode structure 31 of a cell 29A at one end of the stack is electrically connected to the anode cap 32 of adjacent cell 29B via electrically conductive metallic strip element or tab 33A. In a similar manner, the cathode of cell 29B is electrically connected to the anode of cell 29C via conductive strip element or tab 33B and the cathode of cell 29C is electrically connected to the anode of cell 28D via conductive strip element or tab 33C. Accordingly, cells 29A, 29B, 29C, and 29D are electrically connected in series.

Cells 29E and 29F are in effect "folded over" from the aforesaid in-line arrangement and are positioned so that the flat surfaces thereof are essentially perpendicular to those of cells 29A–29D, as shown. The cup-shaped cathode of cell 29D is electrically connected to the anode cap of cell 29E via electrically conductive strip element or tab 33D and the cup-shaped cathode of cell 29E is electrically connected to the anode cap of cell 29F via electrically conductive strip element or tab 33E. Such interconnections assure that all of the cells 29A–29F are electrically connected in series and form a compact assembly thereof in the configuration depicted (sometimes referred to as a "4-2" configuration when six cells are used as shown).

A tape 34 of electrically insulative material is fixedly positioned over the contact points on the cup-shaped cathodes of cells 29A–29D to assure that the surfaces of such cells are insulated from electrical contact with the surfaces of cells 29E and 29F. Alternatively, barrier element 23 of housing 11 can be extended further upwardly from the bottom surface of the housing effectively to a level comparable with that of barrier element 22 so as to fully isolate and assure electrical insulation of cells 29A–29D from cells 29E and 29F, in which case the insulating tape 34 can be omitted.

As seen in FIGS. 1 and 3, a substantially rectangularly shaped terminal board 35 has a conventional and well-known positive snap terminal 36 and a conventional negative snap terminal 37 affixed therein. Such terminal board is of a well known construction and is of a type already readily mass-produced for a variety of standard batteries. The dimensions thereof can be suitably specified for the structure described herein and the board and terminals can be readily and inexpensively fabricated in large quantities for use herein. The interior end 38 (FIG. 3) of positive snap terminal 36 (FIGS. 1 and 3) is electrically connected to the surface of the cup-shaped cathode of cell 29F via electrically conductive strip element or tab 33G, while the interior end 40 of negative snap terminal 37 is electrically connected to the anode cap of cell 29A via electrically conductive strip element or tab 33F, in both cases using appropriate tab-welding techniques. A rectangular opening 42 (FIGS. 1 and 3) is formed at the center region of the top of terminal board 35 as shown.

Figure 4:
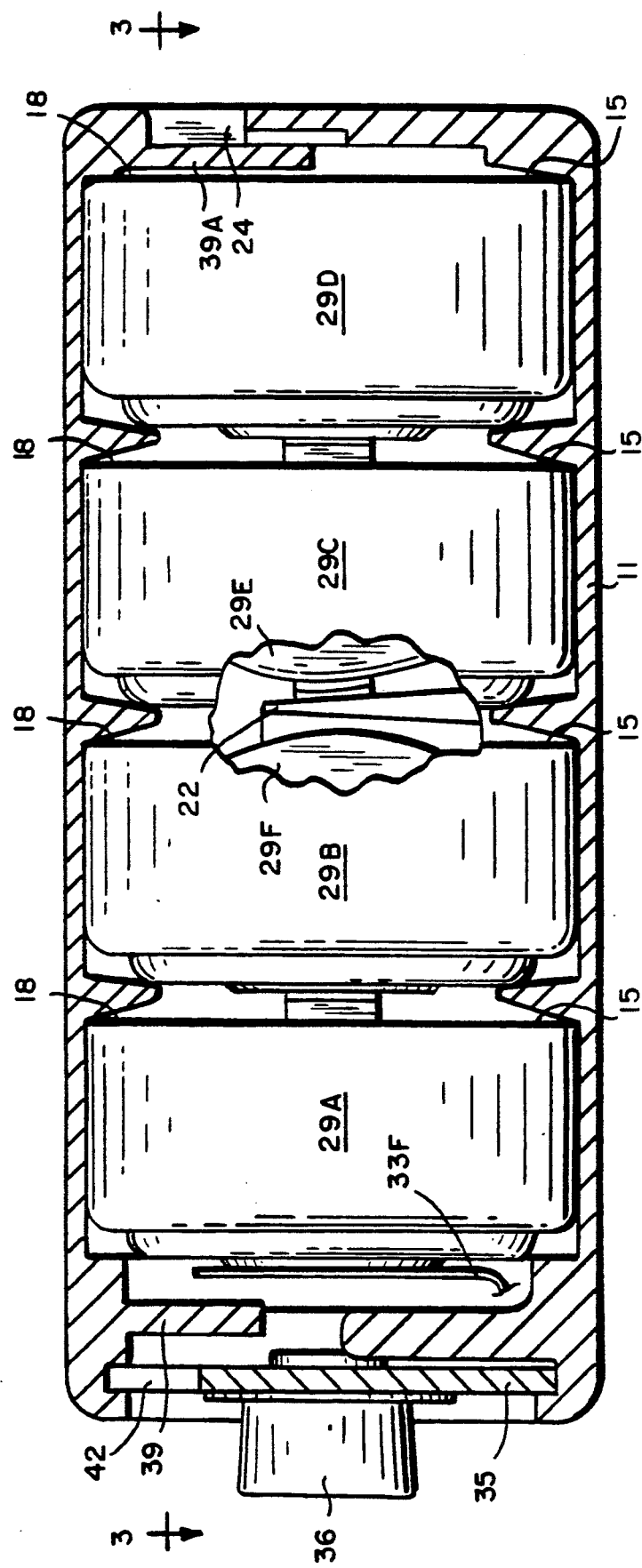
FIG. 4 shows a view in section along the line 4—4 of FIG. 3.

During assembly, once the cell/terminal board assembly is fabricated, the terminal board 35 is inserted into slot 30 and the lower portions of the cylindrical surfaces of the cells 29A–29F are nested in the corresponding concave nesting cavities 15 and 16 at the bottom interior surface of housing 11, as shown, for example, in FIG. 4 with reference to cells 29A–29D in cavities 15. The cover 12 is then positioned on, and suitably affixed to, housing 11 so as to enclose the stack of cells and the terminal board within the housing so that the oppositely disposed upper portions of the cylindrical surfaces of the cells are securely nested in the corresponding concave nesting cavities 18 and 19 in the interior surface of cover 12. Accordingly, when so enclosed, the cells and terminal board in the assembly thereof are securely held in an upright position within the container formed by the housing and cover.

Rectangular openings 24 and 42 in the housing and the terminal board, respectively, at opposite ends of the housing 11 permit air to enter the interior of the container so as to interact with the zinc in the cells to create an electrical potential between the anode cap and the cup-shaped cathode structure of each cell, as would be well known to those in the art. In a particular exemplary embodiment as depicted, each of six zinc/air cells creates an effective electrical potential of 1.5 volts so that the overall assembly thereof produces a potential of 9.0 volts across the anode and cathode snap terminals of terminal board 35.

In order to prevent foreign objects from entering the interior of housing 11 via openings 24 and 42, tab elements 39 and 39A are formed at each end of cover 12, which tab elements effectively cover the openings 24 and 42, respectively, when the overall battery has been fully assembled, so that the air required for operation flows through a relatively tortuous path to each of the cells, while other objects are prevented from entering the housing and making contact with the cells.

Figure 5:
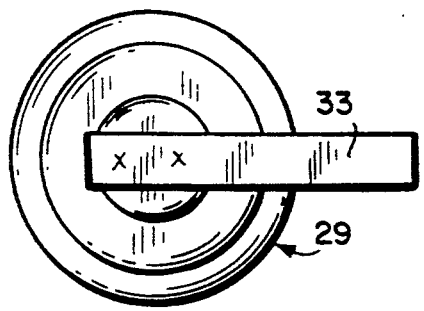
FIGS. 5-12 show views which represent successive steps performed in the fabrication of the cell and terminal board assembly depicted in FIG. 1.
Figure 7:
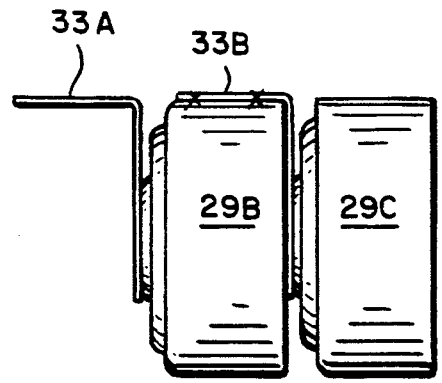
Figure 6:
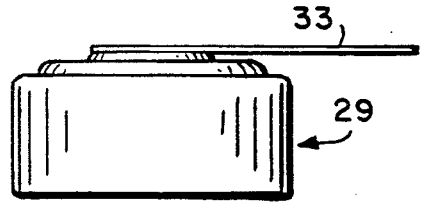

The folded stack cell assembly comprising cells 28A-29F and the interconnections thereof to the terminals of terminal board 35 can be relatively easily fabricated and assembled in accordance with the fabrication steps discussed with reference to FIGS. 5-12. As shown in FIGS. 5 and 6, each cell has an electrically conductive strip element or tab 33 welded to the anode cap thereof as shown in FIGS. 5 and 6 by an exemplary cell 29. The tab of each cell is bent and in turn connected by welding to the surface of the cap-shaped cathode structure of a next adjacent cell as shown in FIG. 7 for the exemplary cells 29B and 29C and the corresponding tabs 33A and 33B.

Figure 8:
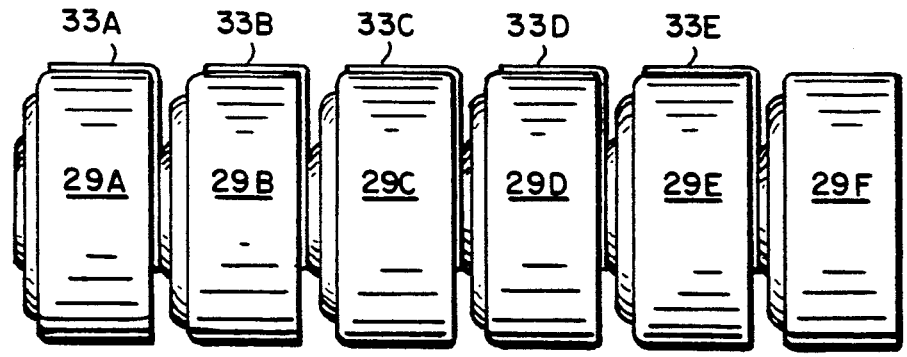

All six of the cells 29A-29F are so interconnected and welded in the same manner, except that a tab which is to be welded to the anode cap of cell 29A from terminal board 35 is not present at that stage and a tab which is to be welded to the cup-shaped structure of cell 29F from terminal board 35 is not present at that stage, as shown by the completed in-line arrangement in FIG. 8. Preferably the welds are made in sequence or with appropriate automation techniques they can be made simultaneously, if desired. The lengths of the welds at the cathodes and anodes of each cell (as shown by the heavy lines in FIG. 3, for example) are such that the cells and the tabs welded thereto can be appropriately manipulated during the assembly process, as depicted in FIG. 5-12, so as to permit the formation of the desired final cell configuration and the connection thereof to the terminal board 35.

Figure 9:
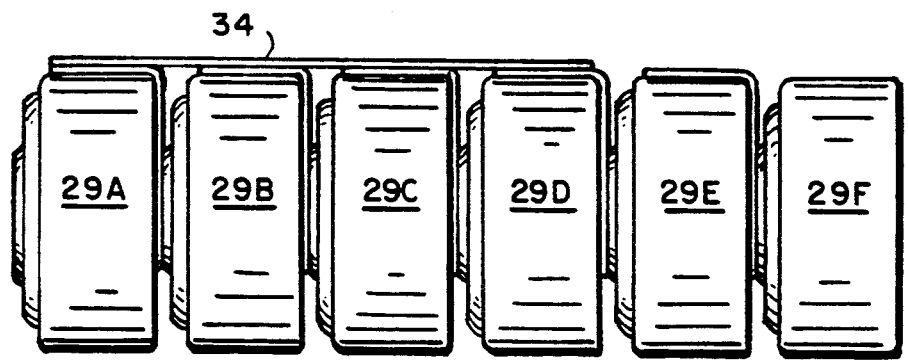
Figure 10:
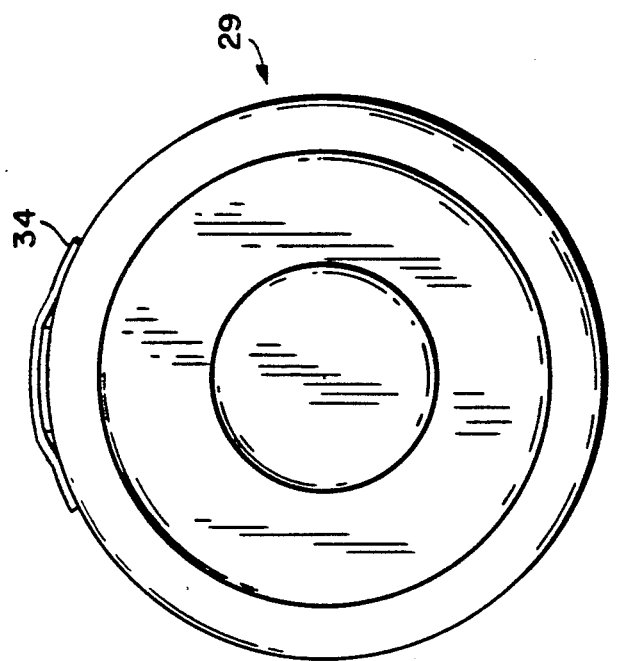

An electrically insulative tape 34 is affixed over the welded regions of the cathode structures of cells 29A-29D, as shown in FIG. 9 and in the enlarged end view thereof in FIG. 10.

Figure 11:
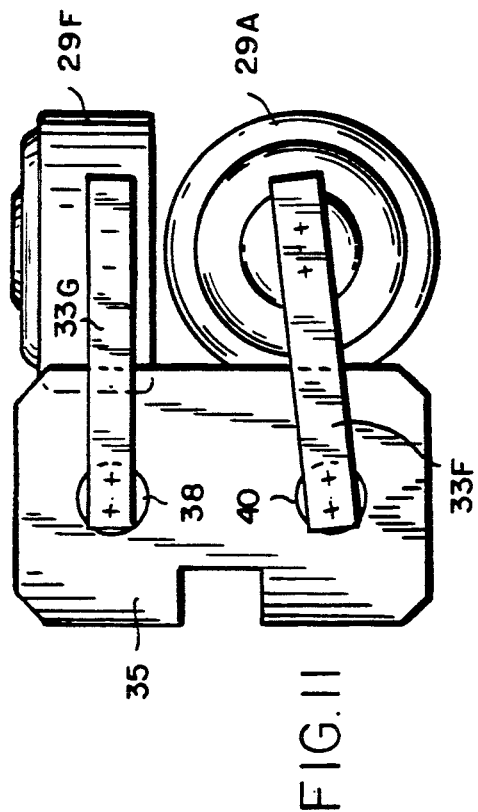
Figure 12:
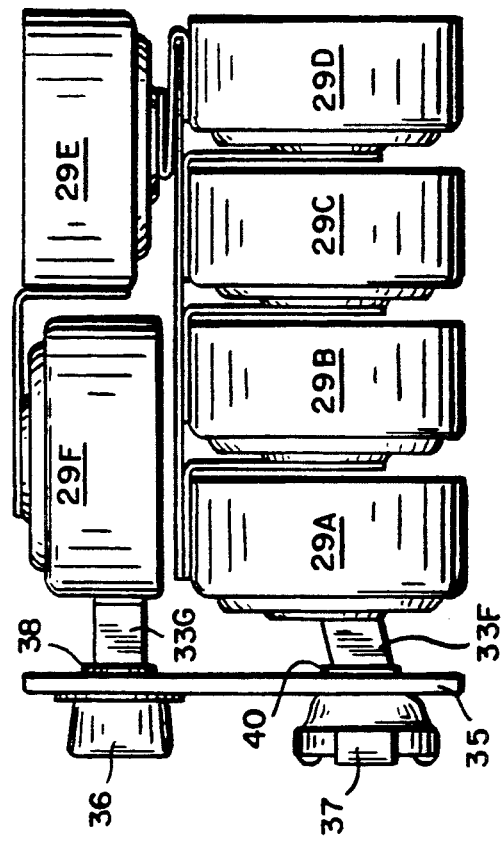

Cells 29E and 29F are then moved away from the in-line arrangement of cells shown in FIG. 9 and are folded over therefrom to be repositioned at the locations shown in FIG. 12, cells 29E and 29F thereby being oriented substantially perpendicularly to cells 29A-29D. A tab 33F is welded to the inner end 40 of the cathode terminal 37 of terminal board 35 and to the anode cap of cell 29A and a tab 33G is welded to the inner end 38 of the anode terminal 36 of terminal board 35 and to the cathode structure of cell 29F, as shown in FIG. 11. The terminal board is then rotated 90° to form the overall stack and terminal board assembly as shown in FIG. 12, which assembly is then ready for insertion into housing 11 after which the cover is affixed and sealed to the housing 10 to form the final battery structure.

Thus, the battery structure of the invention, as shown by the particular embodiment depicted and discussed above, facilitates the use of improved and relatively larger sized, higher capacity zinc/air cells. The use of a plastic housing and cover as configured herein reduces the overall number of components required in the overall structure from that required in previous battery structures of this type and, hence, simplifies the assembly operation. This is particularly significant when compared with similar mercury-oxide battery structures utilizing relatively costly metal jackets requiring additional insulation and more complicated assembly techniques therefor, as well as when compared with the previous zinc/air battery structures described in the aforesaid McArthur et al. patent.

Moreover, by using a well-known, conventionally made terminal board, readily available as an effective off-the-shelf component, the overall structure, as well as the method of assembly thereof, permits the use of well-known tab welding techniques for the electrical contacts required, and does not have to rely on pressure contacts, as used in previous batteries. The configuration used permits automatic tab-welding of all cells in series in an in-line configuration, which configuration can then be effectively and automatically manipulated to form the desired folded cell assembly configuration.

The design of the housing, with the nesting cavities and slot formed therein, as well as that of the cover with the corresponding nesting cavities therein, permits easy insertion of the tab-welded cell/terminal board assembly and ensures a positive and secure fit therefor, while providing good air access, as well as sufficient insulation and clearances to avoid short-circuiting of the components.

The use of openings 24 and 42 and tabs 39 and 39A on the cover thereof assures adequate air access via a relatively tortuous path to the cells but prevents foreign objects from entering and directly contacting the individual cells, thereby permitting the elimination of the porous wall members used in the structure described in the aforesaid McArthur et al. patent.

The use of the structure of the invention keeps the manufacturing costs to a level no greater than that needed for such previous battery structures, even when using the relatively larger, higher capacity cells, while at the same time providing a significantly improved battery as a result.

While the particular embodiment of the invention as described above represents a preferred embodiment of the invention, modifications thereof may occur to those in the art within the spirit and scope of the invention. Hence, the invention is not to be construed as limited to the specific embodiment disclosed, except as defined by the appended claims.

What is claimed is:

1. A battery comprising
   a container including
      a housing; and
      a cover;
      an assembly of cells each having an anode element and a cathode element, said cell assembly including
         a first plurality of cells, each having a first orientation, stacked in a first configuration;
         a second plurality of cells, each having an orientation different from the orientation of said first plurality of cells, stacked adjacent said first plurality of cells in a second configuration, all of the cells in both of said pluralities being electrically connected in series;

a terminal board having a positive and a negative terminal for providing external connections to said battery, said positive terminal being connected to a cathode element of one of the cells of said assembly and said negative terminal being connected to an anode element of another one of the cells of aid assembly;

said housing and cover each having a plurality of corresponding nesting cavities formed in an interior surface thereof, said housing further having a slot formed at one end thereof, the assembly of cells being positioned within said housing and said cover so that said first and second plurality of cells are securely nested in the nesting cavities of said housing and said cover and said terminal board is securely positioned in said slot;

at least one opening formed at one end of said container for permitting air to enter said container for contact with the cells therein; and means for preventing other objects from entering said container through said at least one opening and making contact with any of the cells therein.

2. A battery in accordance with claim 1 wherein said at least one opening includes a first opening formed in said terminal board at one end of said container; and a second opening formed in said housing at the opposite end of said container.

3. A battery in accordance with claim 1 wherein said housing and said cover are each rectangular in shape;

said first plurality of cells are cylindrical, the flat surfaces thereof being positioned adjacent one another in an in-line stack configuration along the long dimension of said rectangular shape, and said different plurality of cells are cylindrical, the cylindrical surfaces thereof being positioned adjacent one another, and said second orientation being substantially perpendicular to said first orientation.

4. A battery in accordance with claim 1 wherein the cells in said cell assembly are electrically connected by tab elements welded so as to connect the anode and cathode elements of said cells in series and so as to connect said cells to the positive and negative terminals of said terminal board.

5. A battery in accordance with claim 1 and further including barrier means formed in said housing for separating the cells of said cell assembly from other cells thereof.

6. A battery in accordance with claim 5 wherein said barrier means includes a plurality of first barriers separating the first plurality of cells from each other;

a second barrier separating said second plurality of cells from each other; and a third barrier separating said first plurality of cells from said second plurality of cells.

7. A battery in accordance with claim 1 and further including electrical insulation means positioned between said first and second plurality of cells in said cell assembly.

8. A battery in accordance with claim 1 wherein each of said cells uses zinc and air which interact so as to produce an electrical potential across the anode and cathode elements thereof.

9. A battery in accordance with claim 1 wherein said first plurality of cells has four cells adjacent each other and said second plurality of cells has two cells adjacent each other.

10. A battery in accordance with claim 1 wherein the nesting cavities of said housing and said cover are arcuate in shape so that oppositely disposed portions of the cylindrical surfaces of said cells are nested securely within corresponding arcuate shaped cavities in said housing and said cover.

11. A method of assembling a plurality of electrical chemical cells each having an anode element and a cathode element for use in a battery, said method comprising the steps of positioning all of said cells in an in-line stack configuration;

tab welding the cathode element of each cell to the anode element of the next adjacent cell in said in-line stack configuration, except for the anode element of the cell at one end of said stack and the cathode element of the cell at the opposite end of said stack;

repositioning at least one of said cells at one end of said stack from their position in said in-line stack into positions adjacent said in-line stack to form a folded cell assembly such that each of said repositioned cells has an orientation which is substantially perpendicular to the orientation of the cells remaining in said in-line stack;

tab welding the cathode element of the cell at one end of said folded cell assembly to one terminal of a terminal board; and tab welding the anode element of the cell at the opposite end of said folded cell assembly to the other terminal of said terminal board.

12. A method in accordance with claim 11 and further including the step of placing an electrically insulated material between the repositioned cells of said cell assembly and the cells remaining in said in-line stack thereof.

13. A method in accordance with claim 11 and further including the steps of inserting said folded cell assembly into a housing;

affixing a cover to said housing to form a battery container such that the terminals of said terminal board are made available externally of said container.

14. A method in accordance with claim 13 wherein said housing has a plurality of nesting cavities formed therein and said inserting step includes inserting said folded cell assembly into said housing so that portions of the surfaces of said cells nest securely within the nesting cavities in said housing.

15. A method in accordance with claim 14 wherein said cover has a plurality of nesting cavities formed therein and said affixing step includes the step of affixing said cover to said housing so that oppositely disposed portions of the surfaces of said cells nest securely within the nesting cavities in said cover.

16. A method in accordance with claim 15 and further including the step of sealing said cover to said housing.

* * * * *